(12) United States Patent
Tsao

(10) Patent No.: US 7,076,491 B2
(45) Date of Patent: Jul. 11, 2006

(54) UPWARD AND DOWNWARD COMPATIBLE DATA PROCESSING SYSTEM

(75) Inventor: Sheng A. Tsao, Rowland Heights, CA (US)

(73) Assignee: Wuxi Evermore, Wuxi (CN)

( * ) Notice: Subject to any disclaimer, the term of this patent is extended or adjusted under 35 U.S.C. 154(b) by 595 days.

(21) Appl. No.: 10/290,903

(22) Filed: Nov. 8, 2002

(65) Prior Publication Data

US 2003/0149699 A1    Aug. 7, 2003

Related U.S. Application Data

(60) Provisional application No. 60/337,644, filed on Nov. 9, 2001.

(51) Int. Cl.
*G06F 17/30* (2006.01)

(52) U.S. Cl. .............................. 707/100; 714/6; 714/15

(58) Field of Classification Search ...................... None
See application file for complete search history.

(56) References Cited

U.S. PATENT DOCUMENTS

| | | | |
|---|---|---|---|
| 4,558,413 A | 12/1985 | Schmidt et al. ............. 364/300 |
| 5,430,878 A | 7/1995 | Straub et al. ............... 395/700 |
| 5,493,671 A | 2/1996 | Pitt et al. .................... 395/500 |
| 5,634,124 A | 5/1997 | Khoyi et al. ................ 395/614 |
| 5,740,405 A | 4/1998 | DeGraaf ...................... 395/500 |
| 5,873,097 A | 2/1999 | Harris et al. ................ 707/203 |
| 5,893,915 A | 4/1999 | Cordell et al. .............. 707/513 |
| 5,915,112 A | 6/1999 | Boutcher .................... 395/684 |
| 5,974,428 A | 10/1999 | Gerard et al. ............... 707/203 |
| 5,983,242 A | 11/1999 | Brown et al. ............... 707/203 |
| 5,991,774 A | 11/1999 | Tate et al. ................... 707/203 |
| 6,014,674 A | 1/2000 | McCargar .................... 707/202 |
| 6,074,435 A | 6/2000 | Rojestal ....................... 717/11 |
| 6,216,136 B1 | 4/2001 | Ronstrom .................... 707/203 |
| 6,243,713 B1 | 6/2001 | Nelson et al. .............. 707/104 |
| 2001/0049681 A1 | 12/2001 | Bova ........................... 707/10 |
| 2001/0054034 A1 | 12/2001 | Arning et al. ................. 707/1 |
| 2002/0091728 A1 | 7/2002 | Kjaer et al. .................. 707/503 |
| 2002/0129054 A1 | 9/2002 | Ferguson et al. ............ 707/503 |

OTHER PUBLICATIONS

KEYpak Product Detail, pp. 1-4 from http://www.keypak.com/prdetail.htm.

*Primary Examiner*—Charles Rones
*Assistant Examiner*—Belix Ortiz
(74) *Attorney, Agent, or Firm*—Robert J. Rose; Michael Fedrick; Sheldon & Mak

(57) ABSTRACT

A version-compatible data processing system including an application program for user interaction with stored data, the application program including means for generating, storing, and retrieving data files that each have an array of the data objects, the means for retrieving including means for determining recognition of the object type of each object, and means for retrieving each unrecognized object without processing. The application program also includes means for processing each recognized object, and means for indicating unrecognized objects, the means for storing also having means for storing unrecognized objects without modification, whereby data files generated and stored by a later version of the application program are processable and restorable as partially processed files by an earlier version of the application program in which not all object types generated by the later version of the program are recognized, the unrecognized objects being subsequently processable upon retrieval of the partially processed files by the later version of the application program.

15 Claims, 3 Drawing Sheets

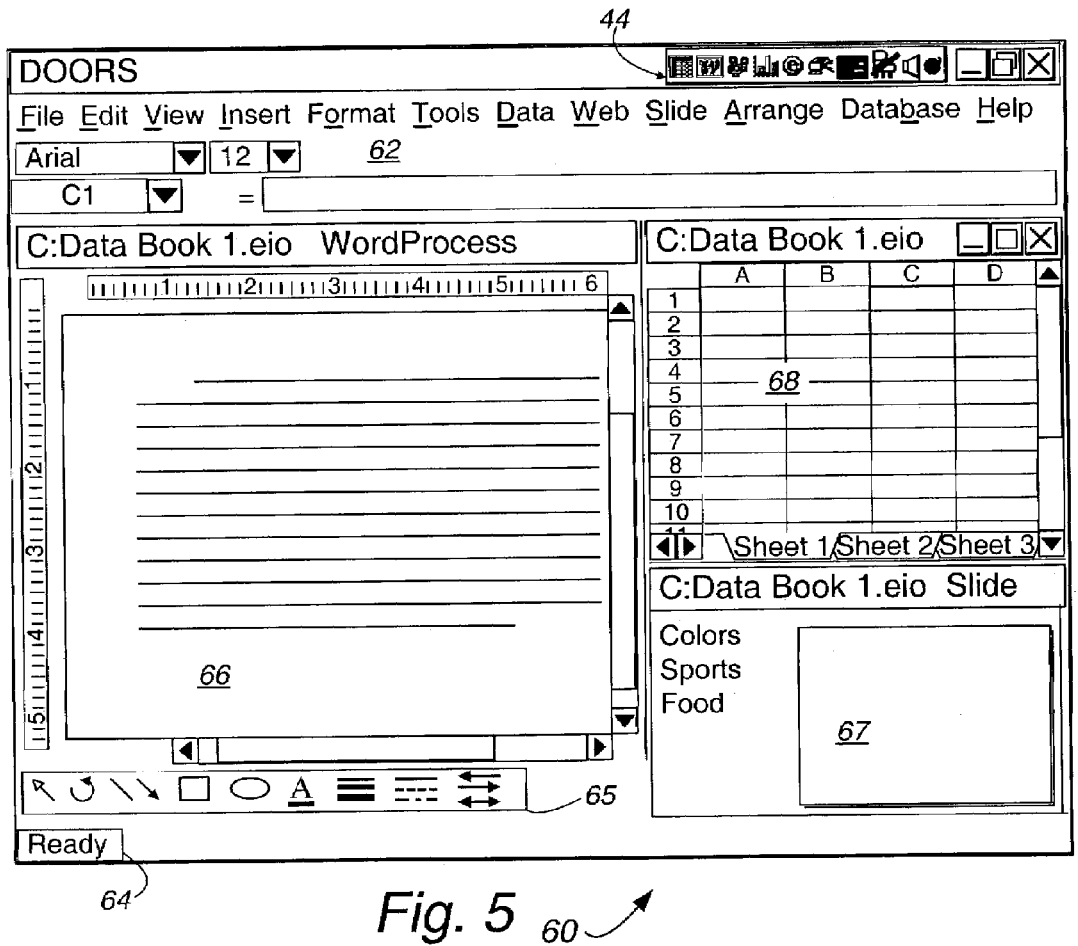
Fig. 5
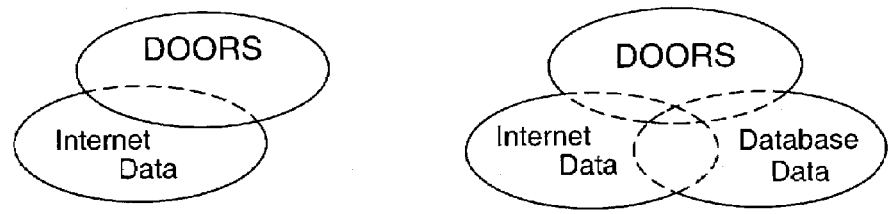
Fig. 7                    Fig. 8

UPWARD AND DOWNWARD COMPATIBLE DATA PROCESSING SYSTEM

CROSS REFERENCE TO RELATED APPLICATION

The present Application claims the benefit of U.S. Provisional Patent Application No. 60/337,644 titled "Spreadsheet Based Data Object Oriented Repository System" filed Nov. 9, 2001, the contents of which are incorporated by reference in this disclosure in its entirety.

BACKGROUND

This invention relates to the operation of office software applications, which in various environments may include various combinations and embodiments of spreadsheet, word processor, desktop publisher, business graphics, presentation graphics, web page composition and publishing, database, electronic mail, personal information management, task scheduling, form and report writer, application generator, online transaction processing (OLTP), multi-dimension decision support system (DSS) and on line analytic processing (OLAP) applications.

It is well known that information processing using even very limited combinations of software gives rise to problems that are not resolved satisfactorily by application software of the prior art. These problems include integration among office applications, integration between database applications and office applications, integration between office applications and massive information existing as web pages on the Internet, integration between database applications and Internet applications, and multi-level and multi-dimensional consolidation and its seamless integration with office applications.

One aspect of these problems relates to the organization of data in spreadsheet applications. In a conventional spreadsheet, there exist four types of data objects, namely, numbers, dates, texts, and formulae. While some spreadsheets contain additional types of data objects, such as graphs and pictures, they are treated in an "ad hoc" way, each such type requiring special treatment by the spreadsheet program. As a result, the potential for integration of spreadsheet applications with other applications is severely limited.

In another aspect of the prior art, each application supports its own data file formats, and multiple applications require multiple sets of file formats for stored work product. This has made cross-application integration difficult, if not impossible. For example, electronic circuit design diagrams may be stored by a computer-aided design (CAD) application in a data file of a specific format, and such a diagram may contain attribute values such as the dimensions of the printed circuit board and certain electric properties required by a word processor application to prepare design documents, or required by a mechanical design application for further design work. However, since each application has its own unique file format, there is no uniform way to retrieve the required information. As another example, in many situations, such as preparing a budget or a business plan, it is often required to integrate various pieces of information that heretofore are processed by different applications and stored in data files of incompatible, drastically different formats. Such integration, even for applications provided by the same vendor, is done awkwardly, if done at all. In addition, exchanging files requires one to carefully prepare links among the exchanged files to avoid data integrity problems such as dangling pointers and linking to incorrect data or incorrect files, even if such links are supported.

Thus there is a need for a system that provides a unified user interface for operation of office applications including both conventional and multi-level database applications of different vendors, each with convenient access to Internet data, that preserves data integrity across plural application types, that facilitates high productivity, and that is compatible with a variety of operating environments.

SUMMARY

The present invention resolves these problems by providing a data object oriented repository system, and related inventive computer environment enhancements. In one aspect of the invention, an integrated multi-application data processing system includes means for generating, storing, and retrieving data files, each data file having a multi-dimensional array of data cells, and a program framework providing a common user interface for at least one application program for user interaction with one or more of the data files. Each of the data cells, which can contain a single data object that includes an object type code and object content, has a unique multi-dimensional cell address with respect to all cells in data files generated by the system. The object content can be self-contained and/or defined in terms of object content of other data objects, and the object type code is indicative of the object content being any of a number, a formula, a date, a text, a page, media data, and binary data other than a number, a formula, a date, or a text. The media data type can be at least a picture, a sound track, or a video clip. The binary data type can be a computer program, an address, or a macro, or other type.

The object type codes can each be associated with respective group, there being a basic data type group wherein the object content is self-contained, a composed data type group wherein each data object comprises references to other data objects and information further defining the object content as reflecting a relationship among the referenced data objects, and a compound data type group wherein the data objects each comprise both self-contained data and references to other data objects. The system can contain one or more of the data files having data objects of each of the basic, composed, and compound data type groups.

Each data object can include an attribute code for defining one or more attributes of the object content. The attribute codes can be defined for a set of attributes including physical data size, display height, display font, display color, display border, display format, a sound attribute, and an image attribute.

The common user interface of the system is preferably operational with plural types of application programs for providing a consistent "look and feel" of otherwise disparate application programs. The plural types of application programs can include a database program, a word processor program, a spreadsheet program, and a graphics program. Preferably the common user interface is operational with the plural types of application programs processing a single data file only, and more preferably, even when the plural application programs have incompatible native data file formats.

The program framework can be operational for activating a data file for processing in accordance with the user interaction, and it can be also operational for recording in a non-activated data file information defining processing to be performed with respect to data objects of the non-activated file. The common user interface can be further operational for initiating the processing to be performed upon activation of the non-activated data file.

In another aspect of the invention, a version-compatible data processing system includes an application program for user interaction with stored data, the application program including means for generating, storing, and retrieving data files that each have an array of the data objects, the means for retrieving including means for determining recognition of the object type of each object, and means for retrieving each unrecognized object without processing. The application program also includes means for processing each recognized object, and means for indicating unrecognized objects, the means for storing also having means for storing unrecognized objects without modification, whereby data files generated and stored by a later version of the application program are processable and restorable as partially processed files by an earlier version of the application program in which not all object types generated by the later version of the program are recognized, the unrecognized objects being subsequently processable upon retrieval of the partially processed files by the later version of the application program. Each object of the data objects can have attribute codes according to standard identifications including attributes identifications, and the means for retrieving can also include means for determining recognition of attributes of each object, and means for retrieving each unrecognized attribute without processing, with data files generated and stored by a later version of the application program being processable and restorable as partially processed files by an earlier version of the application program in which not all object attributes generated by the later version of the program are recognized, the unrecognized attributes being subsequently processable upon retrieval of the partially processed files by the later version of the application program.

Each data file can include a control section containing an indication of a length of the file, and the means for retrieving further can include means for accumulating the length of data elements read in, reading being terminated when the accumulated length of data elements read in is equal to the indicated length of the file.

Preferably the application program further includes means for maintaining a modification trail of each data file, including means for recording the unrecognized objects and pending processing for them, and means for storing the modification trail in association with the corresponding data file, the means for processing also including means for determining and performing pending processing of data objects as previously recorded in the modification trail. Each of the data objects can have a multi-dimensional object address.

In another aspect, a version-compatible data processing system can include first and second versions of the application program, the standard identifications in the second version of the application program being a subset of the standard identifications in the first version, data files generated and stored by the first version of the application program being processable and restorable as partially processed files by the second version of the application program in which not all object types generated by the first version of the program are recognized, the unrecognized objects being subsequently processable upon retrieval of the partially processed files by the first version of the application program.

In another aspect, the invention provides a method for data processing using versions of an application program whereby data files generated and stored by a later version of the application are processable and restorable as partially processed files by an earlier version of the application program, including:

(a) in a first version of the application program, generating a data file comprising an array of data objects, wherein each object includes an object type code and object data, using standard identifications of object types and beginning and end extremities of the object data;

(b) in the first version of the application program, storing the data file;

(c) in a second, earlier version of the application program having associated therewith a subset of the standard identifications, retrieving and processing the data file, comprising:
  (i) determining recognition of the object type of each object;
  (ii) processing each recognized object; and
  (iii) retrieving each unrecognized object without processing;

(d) in the second version of the application program, indicating unrecognized objects; and (e) in the second version of the application program, storing the data file as a partially processed data file, comprising storing the unrecognized objects without modification, thereby permitting the unrecognized objects to be subsequently retrieved and processed upon retrieval of the partially processed file by the first version of the application program.

The method can also include retrieving and further processing the partially processed data file, in the first version of the application program. Also, the method can include in the second version of the application program maintaining a modification trail of each data file, including recording the unrecognized objects and pending processing thereof, storing the modification trail in association with the corresponding data file, also in the second version of the application program and, in the first version of the application program, determining from the modification trail, and performing the previously recorded pending processing of data objects. The generating can also include generating an attribute code in each data object using the standard identifications being further of attributes, and the retrieving can include determining recognition of attributes of each object, processing each recognized attribute, and retrieving each unrecognized attribute without processing.

In yet another aspect of the invention, an integrated data processing system includes an application program that has means for generating and editing data files, each data file including an array of data objects that each have an associated object address, and object content being any of a number, a formula, a date, a text, media data, and binary data other than a number, a formula, a date, or a text, each object address in a data file being unique with respect to that data file. The means for editing includes means for selecting a source subset of the data objects of the data file, the object addresses thereof being source object addresses, means for copying the source subset as target data objects to different object addresses, means for selectively linking the target data objects to their corresponding source object addresses, means for modifying values and/or addresses of the source subset as reflective of further editing of the data file, and means for maintaining the linkages between the target data objects and the source object addresses following modification of the source object addresses. The means for editing also includes means for refreshing the target data objects in response to and to reflect changes in the values and/or addresses of the source subset of the data objects, whereby the target data objects are automatically updated in accordance with the further editing of data files. The media data in the means for generating and editing can be at least one of a picture, a sound track, and a video clip. Similarly, the binary data can be at least one of a computer program, an address, and a macro.

In a further aspect, an integrated data processing system can include the means for generating and editing the data files wherein each object address is unique with respect to object addresses addressable by the system.

The automatic updating can be periodically on a time basis; in response to a predetermined number of changes in values and/or addresses of source data objects; in response to one or more predetermined types of changes in values and/or addresses of source data objects; and/or on demand by a user.

In a further aspect of the invention, an integrated data processing system includes first and second computers connected through a communication network, a first data file having an array of the data objects saved in association with the first computer and a second such data file saved in association with the second computer, the object content being any of a number, a formula, a date, a text, media data, and binary data other than a number, a formula, a date, or a text, each object address being unique with respect to object addresses addressable by the system, the system further including means for automatically updating the second file to reflect changes in the first data file, including one or more target data objects in the second data file that address corresponding source data objects in the first data file.

The first computer can operate a server application program for effecting the changes in the first data file, the second computer having a client application for accessing the second data file.

In yet another aspect, an integrated data processing system includes an application program having means for accessing a database table having elements being fields of respective records of the database table, means for generating a data file including data objects that form a two-dimensional array corresponding to selected elements of the database table. Either rows or columns of the array correspond to respective records of the database table, the columns or rows, respectively, corresponding to respective fields of the database table. The application program also includes means for editing selected data objects of the array, means for indicating particular data objects in the array as being unedited counterparts of the database elements, and means for indicating particular data objects in the array as changed from being unedited counterparts of the database elements. The program preferably also includes means for selecting a subset of the array as being prospectively deleted, and means for indicating the subset of the data objects being prospectively deleted.

Preferably the system also includes means for linking the selected elements of the database table to the corresponding data objects of the array, and means for updating the selected elements of the database in correspondence to the changed ones of the particular data objects of the array. Preferably the system also includes means for inserting a set of data objects into the array; means for indicating the inserted data objects, and means for inserting elements into the database table in the correspondence with the inserted data objects of the array.

The system also preferably includes means for detecting changes to the database table, and means for updating the array to reflect the changes in the database table.

In an additional aspect of the invention, an integrated data processing system includes an application program having means for accessing a web page, means for generating a data file comprising data objects, and object content being any of a number, a formula, a date, a text, media data, and binary data other than a number, a formula, a date, or a text, wherein at least a subset of the data objects correspond to selected elements of the web page, means for detecting changes to the web page, and means for updating the subset to reflect the changes in the web page.

In a further aspect, a method for data processing using an application program includes:

(a) steps for providing a data file comprising an array of data objects, and object content being any of a number, a formula, a date, a text, media data, and binary data other than a number, a formula, a date, or a text, wherein each data object includes a unique object address;

(b) selecting a source subset of the data objects of the data file, the object addresses thereof being source object addresses;

(c) copying the source subset as target data objects to different object addresses;

(d) selectively linking the target data objects to the corresponding source object addresses thereof;

(e) modifying values and/or addresses of the source subset as reflective of editing of the data file;

(f) maintaining the linkages between the target data objects and the source object addresses following modification of the source object addresses; and (g) refreshing the target data objects in response to and to reflect changes in the values and/or addresses of the source subset of the data objects, whereby the target data objects are automatically updated in accordance with the editing of data files. The method can further include providing a second data file, and wherein the source subset is of the first data file and the target data objects are of the second data file.

In a further embodiment, the user can establish linkages between the source data objects and the target data addresses in a single operation after the source data objects and the target data addresses have been identified to the system.

In a further aspect of the invention, a data processing system includes an application program including means for generating and editing data files, each data file including an array of main data objects that each have a unique address with respect to the other main data objects of the array, means for storing the data files in non-volatile memory, wherein the means for generating includes means for receiving in working memory user input defining the address of a main data object of a particular data file, and elements to be included therein, means for determining completion of the main data object, and means for appending the completed data object with the address thereof to a stored counterpart of the data file. The application program also includes means for identifying a most recently appended data object having a particular address, and means for inserting the most recently appended data object as one of the main data objects, whereby, in the event that the content of the working memory is lost, the content of the data file, including the most recently appended data object, is recoverable from the stored counterpart of the data file. The generating and editing can be performed in sessions, the system further comprising means for appending a version mark to the stored counterpart of the data file at the conclusion of each session, the version mark being distinguishable from other version marks appended to the stored counterpart of the data file. The version mark can include date and time information and, optionally, author information. The version mark can also include application information.

The system preferably also includes means for activation of the data file to one or more intermediate states corresponding to user selected versions, which can be a sequence of versions. Also, the system can include means for selecting a particular intermediate state for further user interaction. The system preferably further includes means for selectively accepting and rejecting particular data objects associated with a particular intermediate state, means for selectively accepting a terminal subset of the data objects, and means for selecting and rejecting a terminal subset of the data objects associated with the selected version together with all subsequent versions.

The system can also include, in the means for generating, means for recording a macro of operations to be performed on data objects defined in an editing session, means for appending the macro to the stored counterpart of the data file, and means for executing the macro in a subsequent editing session. Execution of the macro can be activated upon activation of the data file.

In one further aspect, the invention provides a method for data processing using an application program, including:

(a) generating a data file comprising an array of data objects, wherein each object includes an object address;

(b) storing the data file in non-volatile memory;

(c) receiving in working memory user input defining the address of a main data object, and elements to be included therein;

(d) determining completion of the main data object;

(e) appending the completed data object with the address thereof to a stored counterpart of the data file;

(f) identifying a most recently appended data object having a particular address; and (g) inserting the most recently appended data object as one of the main data objects.

The method can also include editing the data file, the data file being active during the generating and editing, and appending the version mark to the stored counterpart of the data file at the conclusion of each session, the version mark being distinguishable from other appended version marks of the file.

BRIEF DESCRIPTION OF DRAWINGS

These and other features, aspects and advantages of the present invention will become better understood with reference to the following description, appended claims and accompanying drawings where:

FIG. 5 is a screen diagram of a common application user interface of the program framework of FIG. 1A, showing three applications running;

FIG. 7 is a Venn diagram showing how the data available on the Internet and the repository of FIG. 2 at any given time can overlap;

FIG. 8 is a Venn diagram showing how the data available on the Internet, the repository of FIG. 2, and a database at any given time can overlap.

DETAILED DESCRIPTION

Figure 1:
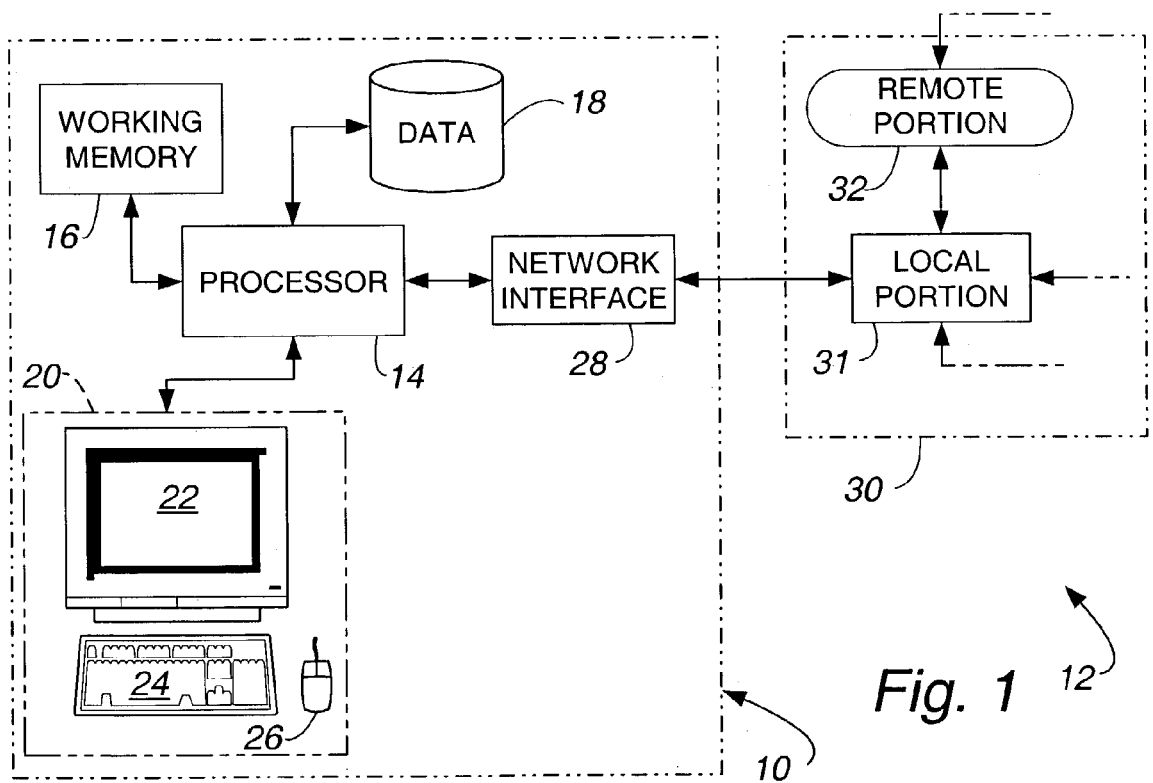
FIG. 1 is a pictorial diagram of a computer processing environment incorporating an integrated data processing system according to the present invention.

The present invention is directed to a system and a set of tools for facilitating integrated data processing among various combinations and embodiments of office application computer programs. With reference to FIG. 1, an integrated data processing system 10 is operative in a computer processing environment 12, the system 10 including a processor 14 having working memory 16 and non-volatile memory 18 associated therewith, a user interface 20 having a display 22, a keyboard 24, and a pointing device 26, and a network interface 28 for communication over a communication network 30. The communication network 30 can include a local portion 31 for connection to local devices, and/or a remote portion 32 for communicating remotely such as over the Internet. It will be understood that the non-volatile memory 18 can include conventional floppy and hard disk drives, mass-storage devices, as well as non-volatile semiconductor memory, and the system 10 can also include other components (not shown) such as printers, scanners, and audio speakers. Moreover, the system 10 can include plural counterparts of the processor 14, memory 16 and 18, user interface 20, and network interface 28, located locally and/or remotely thereto. It will be understood that the term "user interface", in addition to applying collectively to the display 22, keyboard 24, pointing device 26, (and any other physical device with which a user would interact in operating the system 10), may also refer to characteristics of such interaction as defined by a particular application program being operated, sometimes characterized as the "look and feel" of a computer program.

A Data Repository for Integrated Applications

Figure 2:
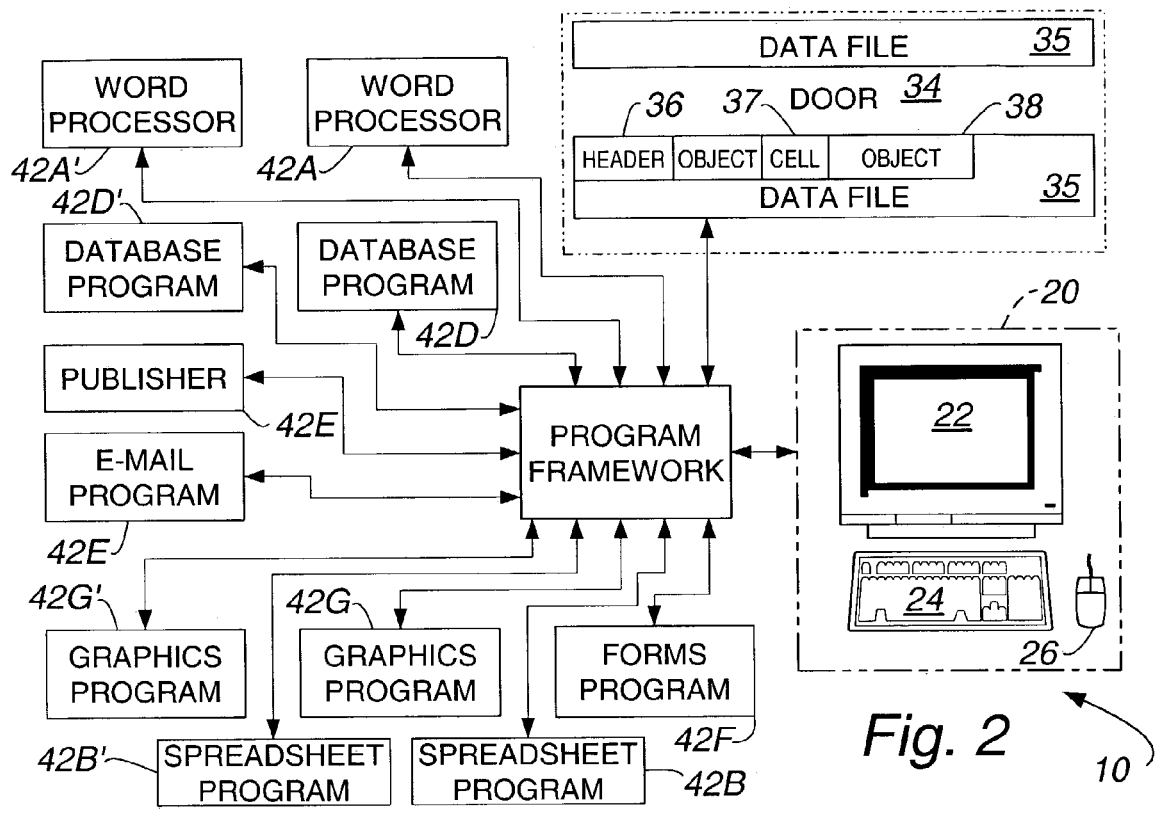
FIG. 2 is a pictorial diagram showing a functional relationship between a program framework, plural application programs, and data files of a data object oriented repository of the system of FIG. 1.

With further reference to FIG. 2, the present invention uses a generalized spreadsheet as a data repository, designated Data Object Oriented Repository (DOOR) 34, including one or more data files 35, each data file having a header 36, and which typically includes plural data cells 37 that can each have stored therein one and only one data object 38, and wherein the data objects are no longer restricted to the four types identified above, namely, numbers, dates, texts, and formulae. Accordingly, the present invention contemplates graphics, audio, web pages, computer programs, etc., as data objects. Since all types of data objects are treated uniformly, new types and even new applications can be readily added to extend the capabilities of the invention. Further, the present invention provides a universal platform both to integrate a great variety of desktop applications and to integrate both database data and Internet data.

Data Object Oriented Repository System (DOORS)

As further shown in FIG. 2, the DOOR 34 is normally an included part of the data processing system 10, which is accordingly also designated Data Object Oriented Repository System (DOORS) 10. Preferred implementations of the DOORS 10 further include a program framework 40 for operating plural application programs 42 to achieve integrated access to the DOOR 34 with a consistent "look and feel" at the operator interface 20. The application programs 42 can include plural types of programs, such as (but not limited to) a word processor 42A, a spreadsheet program 42B, a publisher program 42C, an e-mail program 42E, a forms program 42F, and a graphics program 42G. Further, there can be differently implemented application programs of the same type, as indicated in FIG. 2 by an alternative word processor 42A', an alternative spreadsheet program 42B', an alternative database program 42D, and an alternative graphics program 42G', at least some of the different applications programs 42 having incompatible native data file formats.

A data processing system based on one or more DOORs 34 is also sometimes referred to herein as a DOORS system. A DOORS system comprises a number of data objects contained in a number of data files organized as multi-dimensional arrays and a set of operations that may be applied to these data objects. As described above, each position in the array is called a cell, which can hold a single data object 38 and may also be empty. In addition, there can be, and typically are, "links", which contain unique identifiers of the data objects in the system and serve as references to them as further described below. Each such identifier specifies the data file containing the data object and a series of subscript values of the dimensions of the array in the data file identifying the cell containing the data object.

The operations in a DOORS system are not restricted to arithmetic (such as multiplication and addition), boolean (such as "and" and "exclusive or"), string (such as concatenation and "take substring"), and so on, but they can be also operations such as "scaling down a picture by 30%", "clipping an X second strip of a video, starting from Y second, where X and Y are given time parameters", and other useful operations that will be appreciated by those having skill in the art.

In general, one or more users may be interacting with the system 10, and each user may have a number of data files 35 open for processing, such files being called "active data files".

DOORS Data Objects

The DOORS data objects fall into three groups, namely, Basic Data Objects, Composed Data Objects, and Compound Data Objects. Each data object has content including a data object type code, a value, and zero or more attributes.

Basic Data Objects. These data objects are elementary units of data in the system, and their contents are completely determined without referencing any other data object. They may contain attributes designating various characteristics of the content. Some examples include: numbers, dates, texts, pictures or photos, icons, sound tracks, video clips, URL addresses, and so on.

Composed Data Objects. These data objects contain links, attributes, and information about operations and how these operations are applied to the linked data objects to arrive at respective values or content of such data objects. While a composed data object does not contain any completely internally determined value, it may contain primitive data as attribute values. Examples of composed data objects include: business charts (having, for example, links to a data sequence to be charted and to a chart type definition), desktop publishing pages (having, for example, links to components to be included in such pages and formatting requirements for composing a final page), multiple frame web pages (having, for example, links to a page title, web frame pages, and the relative positions of the frame pages), and presentation slides (having links to respective components and information about how the components go together). Examples of data object attributes include: whether and how much scaling to apply in horizontal and vertical directions, font and size of certain texts, etc.

Compound Data Objects. These data objects contain all the elements of composed data objects and, in addition, may also contain values of basic data objects. For example, a paragraph in a document may contain texts as basic data value, in addition to links to a range in a spreadsheet (also a data object) in the system and links to a picture data object stored elsewhere in the system.

In certain embodiments of the present invention, using a spreadsheet as an example, a DOORS spreadsheet cell may contain a basic data object whose value is the identifier of, say, a large audio-video file that is represented on the display by a certain icon and a title. The data object in this example contains the file identifier (or the file itself in different embodiments), and additional information about how the file is to be processed (played in this example). Further, the identified file itself does not have to be brought into the working memory 16 until the user requests to have it played. The user interface for this DOORS spreadsheet could be defined such that double clicking on an "action icon", such as the icon representing an audio-video file in this example, would cause the identified object to be processed by a predetermined program dependent upon the type of the data object. Thus the user interface of application programs 42 operating under the program framework 40 can be made consistent across a great variety of types of data objects, being easy to use by end users having only ordinary skill.

As another example illustrating the advantage of the DOORS approach, in another embodiment of the present invention, some of the data objects in a DOORS application, although stored in a spreadsheet-like array, could be displayed on the screen easily movable by the user as if floating above the rest of displayed information. Assuming this application to be a word processor, this "floating" data object could be an illustration inserted into the body of the document. This same illustration could be easily used in another part of the document or even in another file, which could be a DOORS presentation application, by simply linking to this illustration. If the illustration is modified later, all links to it would readily, consistently, and reliably reflect the modification. Such linking can be commanded by the user consistently across all DOORS applications supporting this type of data objects, and by implementing a common set of supporting programs across all applications.

Examples of Data Object Types

To illustrate the extensiveness of the DOORS data objects, Table 1 below lists some of the more common data object types and example supporting applications in a DOORS system. Note that any supported data object can be used in any DOORS application. Note also that some of the widely used data objects may be supported at the system level in a framework as a part of the DOORS system.

TABLE 1

Sample Data Object Types and Their Usage

| Data Object Type | Example Application(s) | Comment |
| --- | --- | --- |
| 1) Basic Data Objects | — | Basic Data Objects do not rely on other data objects for content. |
| Number | DOORS framework | May be integer or real number and can be formatted, e.g., as date, time, weights, measurements, area, and so on, and may be used by applications such as spreadsheet and database manager. |
| Text | DOORS framework | May be formatted or unformatted and may have different sub-types |

TABLE 1-continued

Sample Data Object Types and Their Usage

| Data Object Type | Example Application(s) | Comment |
|---|---|---|
| | | with varying degrees of complexity, and may be used in applications such as word processor and computer-aided design programs. |
| URL Address | Web Page Editor, Browser | May be used by, e.g., a stock monitoring application, to access web pages and DOORS data objects. |
| E-Mail Address | Personal Information Manager | May be stored at a central place such as the address book and referenced in any DOORS application. |
| Web Page in HTML | Web Page Editor | The text of the entire page may be stored in the whole as a single data object. If the page were constructed from components treated separately as DOORS data objects, then this would be a Compound or Composed Data Object. |
| Picture or Icon | Image Editor | The data object may contain either the binary image or the identifier of any external file plus pertinent attributes. |
| Sound Clip | Multimedia Editor and Viewer | The data object may contain either the binary image or the identifier of any external file plus pertinent attributes, and used in applications such as presentation and electronic bulletin board. |
| Video Clip | Multimedia Editor and Viewer | The data object may contain either the binary image or the identifier of any external file plus pertinent attributes, and used in applications such as electronic equipment maintenance and mechanic training. |
| Compiler Program | Program Development System | This data object, containing an executable program, may accept source program as data objects and produce compiled programs as new data objects. |
| 2) Composed Data Objects | — | A Composed Data Object contains only links to other data objects. |
| Range of DOORS Cells | DOORS framework | The same range of cells may be linked to at different places in a DOORS system with different display characteristics. |
| Constructed Web Page in HTML | Decision Support System | A Web Page constructed from component data objects stored elsewhere could be referenced in any DOORS application in a uniform way. |
| Report | Personnel System | A report defined and supported by one DOORS application could be used in any other DOORS application such as presentation. |
| Business Chart | DOORS framework | Construct a chart from data objects such as numbers and texts stored in other cells. |
| Organization Chart | Organization Chart Manager | The same organization chart, created and maintained by a single application, could be used by a user to construct an annual report using, e.g., a desktop publisher. |
| Page of Text | Desktop Publishing | The cell contains the information of where the data are stored and how they are formatted together into one page here. |
| Slide | Presentation | A slide may be composed of texts, ranges of cells, bullet items, sound data, video data, etc., that are stored elsewhere, and the slide data object contains only links to these component data objects and how these data objects are put together to construct the slide. |
| 3) Compound Data Objects | — | A Compound Data Object may contain both links and self-contained data. |
| Formula | DOORS framework | This could be the formula of a conventional spreadsheet, but may be used in any DOORS application where such a formula is needed. |
| Formula with references to database data | DOORS framework | Even the above conventional formula could reference data contained in databases in a DOORS system. |
| A book with many chapters | Publishing System | It consists of chapters, each being stored elsewhere as another data object, and included via links to them. |
| Macro Program | Any application | This data object would link to individual macro operations as data objects and contain some macro operations directly as data objects. |

A Powerful And Extensible Multiple Application System

According to the present invention, the program framework 40, being implemented for accessing data files having consistent format definitions as further described below, facilitates incorporation of additional application programs beyond those recognized in a particular implementation of the DOORS 10. To the new application, all existing data objects supported by the DOORS framework 40 are automatically available for processing, thereby saving development work. An application designer can thus concentrate on developing new data object types and to modify or enhance the existing data object types, as needed for the new application. It is often practical to add new applications without even adding new data types when the existing data object types of an existing DOORS system 10 are appropriate.

Figure 3:
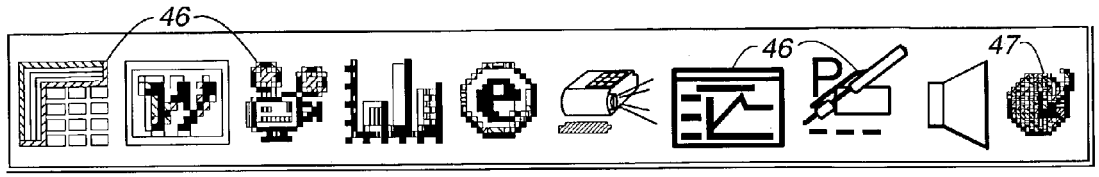
FIG. 3 is a screen diagram of an exemplary application switch bar of the program framework of FIG. 2, the switch bar having a series of application icons.

Thus, for a DOORS system, it is possible and convenient for a third party vendor to add new applications to the system, with or without adding new data object types. With particular reference to FIG. 3, it is contemplated that a system of registration could be maintained for documenting supported application programs, associated application icons and reserved positions thereof in an application switch bar of the program framework 40. As shown in FIG. 3, an exemplary switch bar 44 includes a linear array of program icons 46 for launching respective associated application programs 42, one such icon being a "third party" icon 47 included with an enhanced implementation of the program framework 40.

In one embodiment of the present invention, a Data Object Type (DOT) code is assigned to each type of data objects supported by a DOORS system. An exemplary implementation of such a coding system has four bytes allocated in each data object for holding its DOT code, allowing more than 4 billion different types of data objects in the system.

For each supported data object type, the appearance and external behavior of its member data objects can be defined, and a set of associated operations and processing can be implemented. For example, a data object containing an audio-video clip can be represented by an icon exhibiting an initial image in the clip, and double clicking the icon can initiate playing of the clip. Such behavior is preferably uniform across all DOORS applications, minimizing the effort required by end users to get familiar with proper use of the data objects.

In another example, a DOORS system may support multimedia data objects such as those defining sound, video, picture, animation, etc., by exhibiting only corresponding icons before they are activated. Then, upon demand by the user, these multimedia data objects become activated, while the user can simultaneously work with numbers, texts, charts, etc., in other applications. Such multimedia data objects can be attached to spreadsheet, word processor, computer-aided education authoring program, web page editor, web browser, and any other DOORS application in a uniform way, saving both development and user learning efforts.

As indicated above, once particular data object types are supported within the DOORS 10, all existing applications and future applications to be supported by the program framework 40 can take advantage of them without redundant development work by the developer, and with minimal learning required of end users.

When an existing DOORS system implements a certain standard program interface, it is also possible for third party vendors to develop and package just specialized data object types to facilitate new application development by DOORS application vendors. Such data object package vendors would then reserve specific data object type codes in the above-identified registration system. Further, it is practical to provide a DOORS application development platform for use by developers of DOORS applications. Such a platform can provide a rich set of data object types as building blocks of such applications, and it can advantageously provide an application program interface standard with associated programming tools.

Application Programs as Data Objects

One particularly useful data object type of DOORS 10 is that of application programs. For example, a user may choose to store an entire application program or just a reference to it in a DOORS cell 37. If the user wishes to execute this program many times with different sets of data, the needed data can be prepared elsewhere and stored in separate cells. In each execution of the program, the user then inserts in another cell an execution command referencing both the application program and the required set of data for the particular execution. Further, if the user wishes to save the output from this execution, one or more destination cells can also be specified in the execution command.

As another example, one cell may contain an engineering design diagram for a house, bought from a certain architect firm. Another cell may contain the software program that may be used to edit the diagram. A third cell may contain another program that is capable of analyzing the diagram, produce a file for 3-dimensional virtual image of the house, and produce a bill of materials with estimated costs. A fourth cell may contain a program that is capable of rendering this house in virtual reality based on the file produced by the program in the third cell. This whole package could then be constructed for sale as a commercial product. As a further example, versions of a program under development may be stored in a DOORS spreadsheet, and a user can use the powerful set of spreadsheet tools to construct systematic sets of data for thorough tests of the program. Thus the DOORS 10 is particularly suited for both batch-oriented and interactive processing.

A Single User Interface for Multiple Applications

In certain embodiments of the present invention, all application programs can share user interface elements, including menu command trees and dialog boxes, to any extent desired. No longer are the application designers required to design and develop disparate programs to handle different categories of data, and then painstakingly attempt to integrate them. For example, word processor, spreadsheet, presentation, and HTML file editor programs have similar user interfaces. Instead of having a separate user interface for each application, individual elements of these and other user interfaces can be combined and greatly condensed into a single, common, consistent user interface. This means a consistency in the use of keys and pointing device, appearance, as well as in operation of an online help system. Each application can then have few if any special commands and little if any custom interface functionality. Not only is the development work simplified, the user will also find it easy to use and fast to learn.

Figure 4:
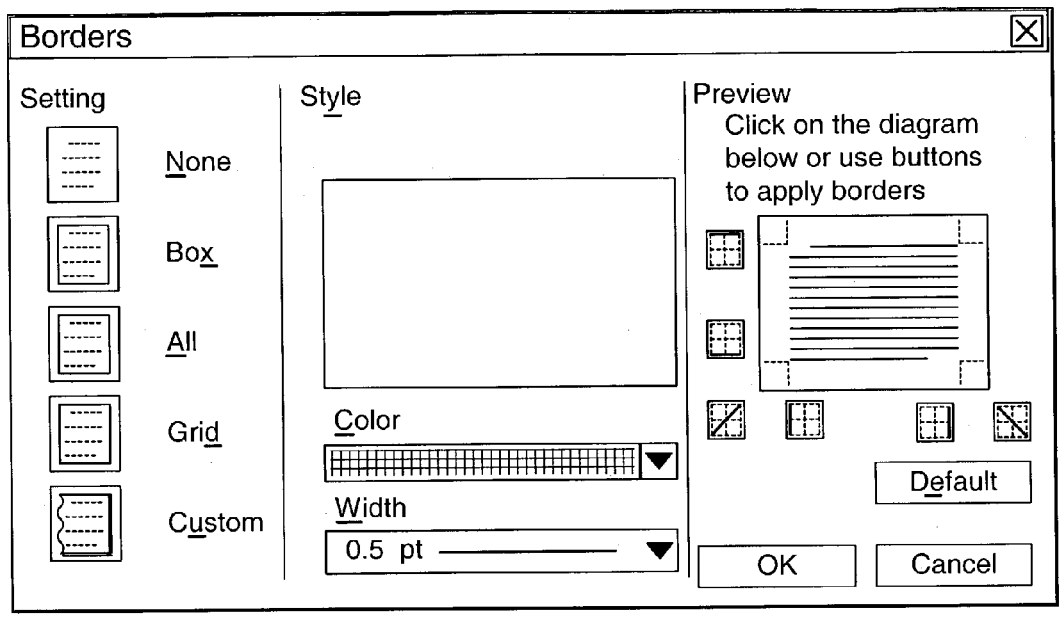
FIG. 4 is a screen diagram of an attribute dialog box of the program framework of FIG. 2.

Another advantage of a common user interface for multiple applications is in improved screen usage when multiple application windows need to be viewed at the same time, as in the case of viewing simultaneously data in a spreadsheet and as linked to a word processor while performing menu actions in both applications. Since the two applications share the same set of menus, usage of the screen area is reduced. Such is not the case with applications that use separate interfaces, in that the plural menus occupy more area on the screen, leaving less area for displaying user data. Users also have less to learn in that the same or similar operations are achieved by the same or similar interface; users will find these operations easy to get accustomed to and easy to remember. The applications can share most of the dialog boxes, tool bars, status bars, and help systems as well. In one example, a format border dialog box 50 to be shared by multiple applications is shown in FIG. 4. The efficient use of screen area made possible by the present invention is also illustrated in FIG. 5, which shows an exemplary shared application user interface 60 having three applications simultaneously open, namely a spreadsheet, a word processor, and a slide presentation. Visible are a common menu 62, the application switch bar 44, a status bar 64, a tool bar 65, in addition to a word processing application 66, a slide presentation program 67, and a spreadsheet program 68.

Single File and Singe File Format

In another important aspect of the present invention, it is possible to avoid many of the problems associated with data sharing in the prior art by storing all data for multiple applications in a single file, using a single file format, thus greatly facilitating data integration. For example, a single file can hold spreadsheets, word processing documents, presentation slides, web pages, and multimedia data. Data integrity of linked data is assured by use of a single file format for the data files 35 in the DOORS 10. By appropriately configuring the data objects 38, for example, it is possible for a mechanical design application to extract and use needed information from electronic circuit design diagrams. Similarly, all applications running on the DOORS 10 can extract and use such information.

As described above, each data object can be stored in a file logically as an array element, referenced by other data objects according to its cell address, much as in the manner of prior art spreadsheet programs, but without many of the limitations of such programs. A cell address for is example, can be in the form of <Sheet Number, Row Number, Column Number>, the indexing subscripts of the three-dimensional array representing the addresses. The cell can also contain certain data and additional attributes to fully represent the data object, and all the cells are stored in the file. This structure is uniform across all applications and for all data object types, including, e.g., number, formula, date, text, paragraph, business chart, sound, picture, web page, video clip, and so on. Therefore, data objects of all types are mixed and stored in a single file.

Specifically, as an illustrative example of implementation of this embodiment, the file format could be in Object Binary File Format (OBFF), whose essence is described below.

A file conforming to OBFF contains a series of data objects of various types. Each data object, as shown in table below, contains a one-byte binary code representing data object type, a two-byte integer representing the data object size in bytes, a one-byte integer representing the number of attributes, and variable (in a predetermined format for each data object type) amount of data representing the data content of the data object, followed by attributes of the data object. Thus, the minimal size of an OBFF data object is 4 bytes, including Object Type Code (1 byte), Object size (2 bytes), and Number of Attributes (1 byte), with no Object Content and no Object Attribute.

TABLE 2

OBFF Data Object Format

| Data Item | Size | Comments |
| --- | --- | --- |
| Object Type Code | 1 byte | Allowing up to 256 different data object types |
| Object Size | 2 bytes | Allowing up to 65536 bytes of total size, including Object Type Code |
| Number of Attributes | 1 byte | Allowing up to 256 attributes for each data object |
| Object Attribute × n | Variable | Using 3 bytes of storage for each attribute (see Table 3 below) |
| Object Content | Variable | Variable size with a predetermined format dependent on Object Type Code |

Each attribute in a data object contains a one-byte Attribute Type Code and a two-byte Attribute Value, as shown in Table 3 below.

TABLE 3

OBFF Object Attribute Format

| Data Item | Size | Comments |
| --- | --- | --- |
| Attribute Type Code | 1 byte | Allowing up to 256 types of attributes |
| Attribute Value | 2 bytes | Interpreted according to Attribute Type Code |

One of the data object types is OBFF File Header Object (FHO), which contains fixed amount of information pertinent to the file. For illustrative purposes, Table 4 below shows a sample of data items that are contained in an OBFF File Header Object. In this example, Object Type Code has a hexadecimal value of 0 Ah. The rest of the data items are predetermined and specific to OBFF File Header Object, and not all of them are given, nor are they discussed here.

TABLE 4

Sample Data Items in an OBFF File Header Object

| Data Item | Size | Comments |
| --- | --- | --- |
| Object Type Code | 1 byte | Value is 0Ah for OBFF File Header Object. |
| Object Size | 2 bytes | A fixed number |
| Number of Attributes | 1 byte | Value is 00h. |
| Size of This Data File | 4 bytes | |
| Number of Versions | 2 bytes | |
| Company Name of Author | 40 bytes | |
| Author Name | 40 bytes | |
| Coded Password | 40 bytes | |
| File Sharing Flag | 1 byte | |
| File Open Flag | 1 byte | |
| . . . | | |

Table 5 below shows a sample of data object types that can be present in the file, along with comments explaining the purpose of each.

TABLE 5

Sample Data Object Types in an OBFF File

| Data Object Type | Abbreviation | Comments |
| --- | --- | --- |
| File Header Object | FHO | Used to indicate file header information |
| User Cell Object | UCO | Used to indicate a cell of the user spreadsheet that contains another data object as its content |
| System Sheet Object | SSO | Used to indicate a cell of the system spreadsheet, normally hidden from the user |
| Version History Object | VHO | Used to indicate a piece of version history |
| Macro Operation Object | MOO | Used to indicate a macro operation for undo/redo, macro processing, as well as delayed processing purposes, and a series of MOOs could represent a macro program to be executed, or an audit trail of operations performed. |
| Other Control Object | OCO | Used to hold additional control information related to the file, and, for example, one specific value could serve as an end of file indicator. |

To illustrate how a data object can be contained in a spreadsheet cell, a User Cell Object is defined. Such an object contains the address of the cell, consisting of its sheet number, row number, and column number, plus the contained data object, and associated cell attributes. The data object contained in a User Cell Object also follows the general data object format shown in Table 2 above. The data items of a User Cell Object are shown below in Table 6. It will be understood that other cell types are contemplated, being not described here further.

TABLE 6

Data Items in a User Cell Object

| Data Item | Size | Comments |
| --- | --- | --- |
| Object Type Code | 1 byte | Value 10h (see Table 7 below) |
| Object Size | 2 bytes | |
| Number of Attributes | 1 byte | |
| Object Attribute × n | Variable | Attributes of the cell |
| Sheet Number | 1 byte | Allowing up to about 256 sheets, including system sheets |
| Row Number | 2 bytes | Allowing up to about 65536 rows |
| Column Number | 2 bytes | Allowing up to about 65536 columns |

TABLE 6-continued

Data Items in a User Cell Object

| Data Item | Size | Comments |
|---|---|---|
| Object Content | Variable | Contained data object in its own format |

Table 7 gives the specific code values assigned to the above data object types and additional data object types. Specific formats for Object Content for each data object type are not given.

TABLE 7

Sample Data Object Type Codes

| Hexadecimal Value | Data Object Type | Abbreviation | Comments |
|---|---|---|---|
| 0Ah | File Header Object | FHO | See Table 5 above |
| 10h | User Cell Object | UCO | See Table 5 above |
| 11h | System Sheet Object | SSO | See Table 5 above |
| 12h | Version History Object | VHO | See Table 5 above |
| 13h | Macro Operation Object | MOO | See Table 5 above |
| 14h | Other Control Object | OCO | See Table 5 above |
| 22h | Long Number Object | LNO | A four-byte floating number |
| 23h | Integer Number Object | INO | A two-byte integer |
| 24h | Double Number Object | DNO | An eight-byte floating number |
| 25h | Null Object | NO | Null content |
| 26h | String Object | STRO | A string of characters |
| 27h | Sound Object | SOUO | A sound clip |
| 28h | Formula Object | FORO | A conventional spreadsheet formula |
| 29h | Animation Object | ANIO | An animation clip |
| 2Ah | AutoShape Object | AUTOSHAPEO | A user constructed shape "floating" above other cells |
| 2Bh | Chart Object | CHARTO | A business chart |
| 2Ch | Paragraph Object | PARAGRAPHO | A word processing paragraph of texts and other objects |
| 2Dh | Slide Object | SLIDEO | A slide used in presentation |

Table 8 below presents sample attribute type code values that are used in an Attribute to indicate various properties of a data object.

TABLE 8

Sample Attribute Type Codes

| Hexadecimal Value | Attribute Type | Abbreviation |
|---|---|---|
| A0h | Font Name Attribute | FONTNAMEA |
| A1h | Font Size Attribute | FONTSIZEA |
| A2h | Font Bold Attribute | FONTBOLDA |
| A3h | Font Italic Attribute | FONTITALICA |
| A4h | Foreground Attribute | FOREGROUNDA |
| A5h | Background Attribute | BACHGROUNDA |
| A6h | Single Line Attribute | SINGLELINEA |
| A7h | Double Line Attribute | DOUBLELINEA |
| A8h | Horizontal Alignment Attribute | HORALIGNMENTA |
| A9h | Vertical Alignment Attribute | VERALIGNMENTA |
| AFh | Image Attribute | IMAGEA |
| ABh | Sound Attribute | SOUNDA |
| ACh | Pattern Attribute | PATTERNA |
| . . . | | |
| B0h | Horizontal Middle Border Attribute | HORMIDBORDERA |
| B1h | Vertical Middle Border Attribute | VERMIDBORDERA |
| B2h | Upper Border Attribute | UPPERBORDERA |
| B3h | Bottom Border Attribute | BOTTOMBORDERA |
| B4h | Left Border Attribute | LEFTBORDERA |
| B5h | Right Border Attribute | RIGHTBORDERA |
| B6h | North East Border Attribute | NEBORDERA |
| B7h | South East Border Attribute | SEBORDERA |
| . . . | | |
| BAh | Hor-Mid Border Width Attribute | HMBORDERWIDTHA |
| BBh | Ver-Mid Border Width Attribute | VMBORDERWIDTHA |
| BCh | Up Border Width Attribute | UPBORDERWIDTHA |
| BDh | Bottom Border Width Attribute | BOTBORDERWIDTHA |
| BEh | Left Border Width Attribute | LEFTBORDERWIDTHA |
| BFh | Right Border Width Attribute | RIGHTBORDERWIODTHA |
| C0h | North-East Border Width Attribute | NEBORDERWIDTHA |
| C1h | South-East Border Width Attribute | SEBORDERWIDTHA |
| . . . | | |
| C8h | Hor-Mid Border Color Attribute | HMBORDERCOLORA |
| C9h | Ver-Mid Border Color Attribute | VMBORDERCOLORA |
| CAh | Up Border Color Attribute | UPBORDERCOLORA |
| CBh | Bottom Border Color Attribute | BOTBORDERCOLORA |
| CCh | Left Border Color Attribute | LEFTBORDERCOLORA |
| CDh | Right Border Color Attribute | RIGHTBORDERCOLORA |
| CEh | North-East Border Color Attribute | NEBORDERCOLORA |
| CFh | South-East Border Color Attribute | SEBORDERCOLORA |
| D0h | Underline Color Attribute | UNDERLINECOLORA |
| D1h | Underline Style Attribute | UNDERLINESTYLEA |
| D2h | Number Format Attribute | NUMBERFORMATA |
| D3h | Number Format Index Attribute | CATEGORYINDEXA |
| D4h | Merge Attribute | MERGEA |

As an example of a specific file, a new data file may have been created and modified so that cell A1 contains the string "Test one", cell A2, the string "Test two", and cell A3, the string "Test three". The contents of OBFF File Header Object, in the case of all strings being stored as data objects in a cell, can be as shown in Table 9, the rest of the file contents being shown in Table 10. A blank row in Table 10 is used to separate the data objects for clarity. Some of the contents of the data items are not given and are shown as $N_1$, $T_2$, etc.

TABLE 9

Partial OBFF File Header Object Content of Example File

| Data Item | Content | Comments |
|---|---|---|
| Data Type Code 0Ah | 0Ah | Pre-assigned value 0Ah for OBFF File Header Object |
| Data Object Size | $N_1$ | Number indicating the size of this object, in bytes |
| Number of Attributes | 0 | |
| Size of This Data File | $N_2$ | Number indicating the size of this file, in bytes |
| Number of Versions | 3 | Value 3 indicating the number of versions stored in this file |
| Company Name of Author | $T_1$ | Character string indicating the company of the author |
| Author Name | $T_2$ | Character string indication the name of the author |
| Coded Password | $B_1$ | Binary value of password in coded form for access control |
| File Sharing Flag | $N_3$ | A flag indicating if the file is being shared |
| File Open Flag | $N_4$ | A flag indicating if the file is open |
| . . . | | |

TABLE 10

An Example File Content

| Data Item | Content | Comments |
|---|---|---|
| Object Type Code | 10h | User Cell Object |
| Object Size | 21 | In bytes |
| Number of Attributes | 0 | |
| Sheet Number | 0 | Sheet 0 |
| Row Number | 1 | Row 1 |
| Column Number | 1 | Column A |
| Object Type Code | 26h | String Object |
| Object Size | 12 | In bytes |
| Number of Attributes | 0 | |
| Object Content | "Test one" | |
| Object Type Code | 10h | User Cell Object |
| Object Size | 21 | In bytes |
| Number of Attributes | 0 | |
| Sheet Number | 0 | Sheet 0 |
| Row Number | 2 | Row 2 |
| Column Number | 1 | Column A |
| Object Type Code | 26h | String Object |
| Object Size | 12 | In bytes |
| Object Content | "Test two" | |
| Object Type Code | 10h | User Cell Object |
| Object Size | 22 | In bytes |
| Number of Attributes | 0 | |
| Sheet Number | 0 | Sheet 0 |
| Row Number | 3 | Row 3 |
| Column Number | 1 | Column A |
| Object Type Code | 26h | String Object |
| Object Size | 13 | In bytes |
| Object Content | "Test three" | |

It is easy to see that any data object conforming to OBFF format can be contained in such a spreadsheet. Specifically, User Cell Object (UCO) may contain application data such as formatted paragraphs and multimedia files, as long as such data objects are supported.

In addition, certain information such as that which is entered in a dialog box to define, say, system options, can be defined and stored in a spreadsheet normally hidden from the user. To serve this purpose, a System Sheet Object (SSO) can be defined as a special worksheet to hold these and other system information as named cells containing values.

Macro Operation Processing

It is advantageous to define units of operation, called "macro operations", that can be performed on the data objects 38 in the DOORS 10. For example, when working with a data file 35, the following can all be defined as macro operations: entering certain data into a cell, clearing the contents of a cell, inserting a row of cells duplicated from elsewhere, inserting an arithmetic series into a range of cells, and so on.

Macro operations can be used as undo/redo units. That is, after an operation is performed, a user may choose to remove all of its effects as if the operation were never performed. This is known as "undo". Immediately after, the user may choose to have the exact same operation performed again by issuing a command to the system without repeating the previous actions. This is known as "redo". Macro operations are useful in recording the actions of a user to support undo/redo functions.

In addition, by supporting macro operations, the DOORS 10 of the present invention can incorporate other desirable features as described in subsequent sections.

In a DOOR 34, the specification for a macro operation can be encapsulated as a data object, designated Macro Operation Object (MOO). Continuing with the OBFF example given above, an example of the format for an MOO in OBFF is shown in Table 11 below.

TABLE 11

An Example Format of OBFF MOO

| Data Item | Size | Comments |
|---|---|---|
| Object Type Code | 1 byte | Value is 13h. |
| Object Size | 2 bytes | |
| Number of Attributes | 1 byte | |
| Object Attribute × n | Variable | |
| Macro Operation Code | 2 bytes | See Table 12 below. |
| Sheet Number | 1 byte | |
| Macro Operation Data | Variable | Exact format not specified |
| Target Range of Cells | 8 bytes | Two pairs of (Row Number, Column Number) designating the two corners of a range |

Table 12 below shows some of the Macro Operation Codes used for spreadsheet operations.

TABLE 12

Sample Macro Operation Codes for a Spreadsheet

| Hexadecimal Value | Macro Operation | Comments |
|---|---|---|
| 0001h | Create a Sheet | |
| 0002h | Delete a Sheet | |
| 0003h | Enter Data into Cell | |
| 0004h | Insert Row(s) | |
| 0005h | Delete Row(s) | |
| 0006h | Insert Column(s) | |
| 0007h | Delete Column(s) | |
| 0008h | Sort a Range of Cells | |
| . . . | | |

Work Recovery Using Recorded Macro Operations

Work recovery is important, for unexpected conditions may occur to cause work loss. For example, an application may malfunction and abort, the operating system may abort, or there may be a power failure without warning. To minimize work loss under unexpected conditions, in prior art, a user is required to save work frequently, or the system may support periodical save automatically. The user is usually offered to choose exactly which pieces of work, e.g., word processing documents, to be saved periodically. Choosing to save more work more frequently will use more system resources and cause more work slowdown or even temporary stoppage, decreasing the usability of the system.

In an embodiment of the present invention wherein Macro Operation processing is supported, it is possible to implement work recovery capability with minimal impact on user convenience and use of system resources. The method can comprise recording Macro Operation Objects while a user is working with the system. For guaranteed work recovery, the method ensures that the MOOs are saved to external storage at judiciously chosen times, such as immediately after a user's hitting the return key or when the user leaves a spreadsheet cell. The user is completely relieved of the chore of saving his work frequently.

For example, recording of macro operations can start at a point when the file being worked on is at a known good state, such as immediately following retrieval from external storage. This can be carried out at the system level by the program framework 40, independent of and shared by all applications. Technologies exist to implement this simply, efficiently, and reliably, such as the body of knowledge in implementing audit trails of a database management system. In some cases, this can be done by simply opening a file, appending the recording at the end of the file, and closing the file.

To recover work from an aborted session, continuing on the previous example, the recorded Macro Operations are "played" (performed) in the recorded sequence to carry out the processing before the work session was aborted, in the fashion of "redo" operation. Thus in this scenario a user can power off the computer at any time with almost no concern for losing his work done on the system.

Multiple Versions of Work Maintained in a Single File

In one embodiment of the present invention supporting macro operation recording, it is possible to save multiple versions of work in a single file. Starting with a file in known good state, such as a new file or a previously saved file, the system can continue to record macro operations generated in a session, and, at the close of the session or upon a request by the user, save these operations and mark it as a new version instead of saving completed work after all processing is performed during the session. Following this process, multiple versions of work can be effectively maintained in a single file, because any previous version of work can be recovered by playing back macro operations so saved. Saving multiple versions of work by recording macro operations generally requires much less storage than saving completed versions of work themselves.

In addition to recovering previous versions of work, the system in the above described embodiment can support a step-by-step playback feature, showing the results of each operation during the recovery process. This can be used, for example, as a sales presentation or as a training tutorial. The system can also support different behavior while opening such a multi-version file, as instructed by the user according to the purpose of creating the file. The system may: (1) present the first version, (2) quickly play back all the macro operations to present the latest version, (3) present the first version and start step-by-step playback of the macro operations, or, in the most general case, (4) play back the macro operations according to a particular script.

Figure 6:
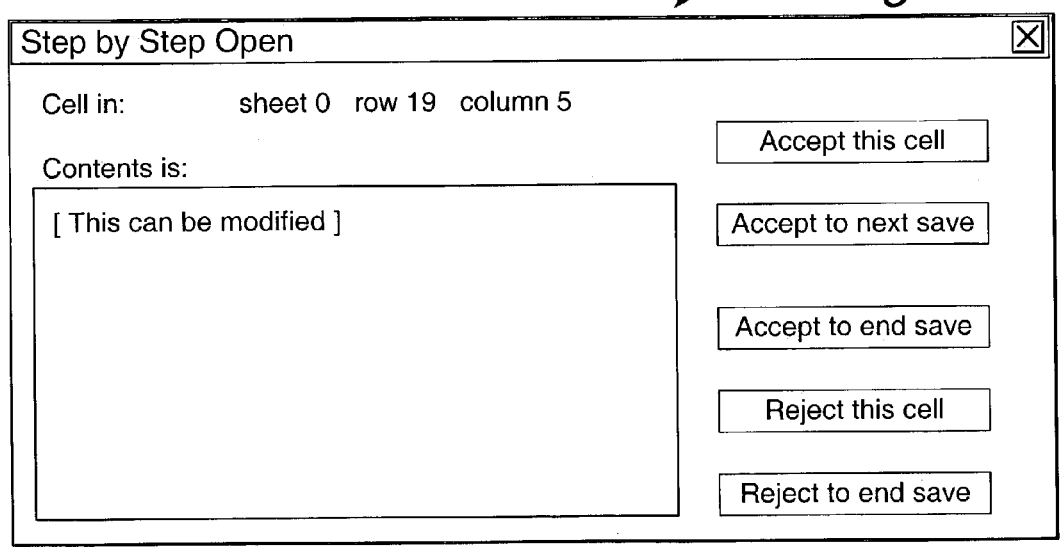
FIG. 6 is a screen diagram of a dialog box of the program framework of FIG. 2, for opening files to earlier versions.

Another possible implementation of step-by-step open is as follows. A user can modify the data content while the file is being opened in step-by-step mode. A suitable incremental open dialog box 70 for this purpose is shown in FIG. 6. The user choices are listed in table 13 below.

TABLE 13

Sample Choices during a Step-by-Step Open of Multiple Version File

| User Choice | Comments |
| --- | --- |
| Accept this Cell | Play this Macro Operation as modified |
| Accept to Next Save | Play this and all Macro Operations to the end of current version |
| Accept to End Save | Play this and all Macro Operations to the end of file |
| Reject This Cell | Do not play this Macro Operation |
| Reject to End Save | Stop playing Macro Operations |

To control the amount of storage consumed, the system may allow the user to choose the number of versions kept on the file, and also allow the user to choose a new starting point at a version newer than the original, discarding all data before that point. For example, a user may limit the number of versions maintained in a file to be five, and as the sixth version is about to be appended, discard the first version and create a new first version from the original second version. Continuing this example, the user may at a later time choose to keep only the latest version, discarding all previous versions, or to choose to keep only the third version, discarding all other versions.

There are other applications to this invention. For example, the multiple recordings of Macro Operations can be modified, spliced, merged, and otherwise edited to create new macro processing. A teacher can review the operations performed by a student and suggest improvements in the student's ability to use a particular application. The Macro Operations of modifying an important financial record or a critical document can be kept as an audit trail to trace the responsibility of a particular operator.

Integrating Database Tables

In prior art, records from database tables are brought into spreadsheet or other office application through a one-time or pre-saved query, or through a copy-paste process. There are no links maintained between individual elements of individual records and the spreadsheet cells. To keep a copy of such data in sync with the database, another query must be performed. Problems are often caused due to discrepancies of data. For example, the price of a certain stock may have changed while a user makes a decision based on the data that was brought to the spreadsheet some time ago.

Preferably, the present invention also provides a two-way linkage between a database table and a two-dimensional array in any application of the system. That is, data can be modified in database and the modification reflected in the corresponding DOORS array according to a specified mechanism, and data can be modified in the DOORS array and the modification being written back to the database according another, possibly the same, mechanism. This feature is called Database Integration.

Database Integration is accomplished by first identifying a part of a database table, being a two-dimensional array, called A. Then, certain data objects in a DOORS system are chosen to form another two-dimensional array of identical size, called B. A correspondence is then established by the system between each element of Array A to each element of Array B, and the data is fetched from Array A to fill in Array B. In one embodiment of the present invention, the elements of Array B can be displayed as rows and columns to the user for manipulation. In the display, the rows could correspond to the records in the database table and the columns to the fields, and the elements of Array B may be intermixed with other data objects not involved in this correspondence.

Once the correspondence is established, the user can make changes to data in Array B, and Array B can change after the data is fetched from Array A, and the system can synchronize the two copies of data from time to time. To facilitate work by the user, in the previous embodiment of the present invention, the rows of this display can be specially marked with indicia to indicate the status of DOORS data since the correspondence was first established or the last successful synchronization: (1) rows uninvolved with this correspondence, (2) rows that have not changed, (3) rows that have changed, (4) rows that have been deleted, and (5) rows that are inserted into this correspondence. An example of such marks is shown in table 14 below.

TABLE 14

Example Marks of Row Status Indicator for Correspondence with a Database Table

| Indicia | Meaning |
| --- | --- |
| " " | Not Involved in this correspondence |
| "N" | A row inserted since the last synchronization |
| "R" | A record from the database, unchanged |
| "D" | A record deleted from this correspondence since the last synchronization |
| "M" | A record changed since the last synchronization |

An embodiment of the present invention can also provide a method for synchronization of database data and DOORS data, which can include:

1) Retrieving the selected data from a database table.

2) Determining the changes that have occurred in the database and compare them with changes in the DOORS data.

3) For each element in the correspondence, if only one side of the correspondence has changed, updating the unchanged side with the changed data.

4) If both sides of an element have changed, deciding the prevailing side by following a preset policy, such as one side always prevails, or the more recent change prevails if the time of change can be determined.

Exemplary conditions that can trigger synchronization are:

Immediately after the correspondence is established;
Immediately after the data file containing the selected data objects is opened;
Immediately after the data file containing the selected data objects is closed;
Periodically on a time basis;
Whenever there is any change in the correspondence data on the DOORS side;
On demand by a user; and
Whenever some other criteria detectable from a DOORS application are fulfilled.

Possible extensions to the Database Integration feature described above include:

Both rows and columns can be marked as described above, allowing adding and deleting fields in the database table;
The rows and columns in the correspondence display can be reversed, with rows corresponding to the fields of the database table and columns corresponding to the records; and
The display of a correspondence can take the form of a "Data Form", showing one record at a time from the database. Such a data form may be automatically generated from the database schema information, and the fields in the data form may contain, among other things, various validation rules based on data elsewhere in the DOORS system.

Some of the advantages of Database Integration are:

Database records can be queried and updated using the spreadsheet or any other application with which a user is familiar and competent without requiring complex programming and setups;

Using the relational database model and existing technologies such as ODBC (Open Database Connectivity) and JDBC (Java-based Database Connectivity) a user can use a spreadsheet or any other application capable of handling two-dimensional arrays to integrate data from all sources without programming skills;

With the Row Status Indicators, the synchronization process can be interrupted for whatever reason without compromising data integrity;

Establishing a correspondence between a two-dimensional array in a DOORS system and data in a multi-level, multi-dimensional decision support system allows bidirectional linkages, permitting more powerful analysis and action-provoking applications to be used to take advantage of the information provided by the decision support system; and In general, any piece of data accessible from a database can be stored in a DOORS cell and its link maintained, so that that piece of data can be used just as any other native data within the DOORS system. This achieves very tight and seamless integration of database data into a DOORS system.

Integrating Internet Data

In a DOORS system, Internet data in the form of Web pages or data forms accessible with the URL (Universal Resource Locator) or a similar mechanism can be accessed and effectively integrated with the rest of data in the DOORS system. Also, applications in a DOORS system can publish its data to the Internet in the form of Web pages or data forms accessible with the URL or a similar mechanism.

A DOORS application can detect and synchronize changes in its referenced Internet data on one or more of the following occasions:

Periodically on a time basis;
Immediately after the data file containing the Internet reference is opened;
Immediately before the data file containing the Internet reference is closed;
On demand by a user; and
Whenever some other criteria detectable from within the DOORS application are fulfilled.

When a DOORS application publishes data to the Internet, the published data can be updated to reflect their changes after the last publication on one or more of the following occasions:

Periodically on a time basis;
Immediately after the data file containing the published data is opened;
Immediately before the data file containing the published data is closed;
On demand by a user; and
Whenever some other criteria detectable from within the DOORS application are fulfilled.

Some of the applications of this Internet Integration feature are:

- A stock portfolio management system monitors stock data and company information from various web sites and recommends or takes appropriate actions related to a certain stock;
- Pieces of data related to a movie star may be obtained from various Web pages and consolidated and analyzed to trigger news alert conditions to a news reporter;
- Various members of a sports news team may watch a baseball game, each recording data about different aspects of the game such as strikes, errors, and runs by the individual players, while the DOORS application publishes the consolidated data to the Internet about the game on a real-time basis; and
- In general, any piece of data from the Internet may be stored in a DOORS cell and its link maintained, so that that piece of data can be used just as any other native data within the DOORS system. This achieves very tight and seamless integration of Internet data into a DOORS system.

With all these mechanisms combined together, the entire information available on the Internet can circulate in DOORS environments according to the present invention automatically and quickly. Once any data object is changed inside a DOORS, the web page may be changed almost instantly, and upon the software requesting the re-publishing of this web page, visitors to the web page are then downloading the most current information. After finishing a download to a DOORS, the data can then be dissected into cells as data objects that can be processed, users may then use these dissected data objects to perform analysis and decision making, which may again result in the change of another web page to be published, etc. This process may be triggered continuously to keep the web pages published on the Internet circling around DOORSs. This will make DOORSs the center of the Internet Cyberspace.

This kind of function can be extremely useful in many applications in which users wish to get updated frequently as the events are unfolding, such as the medal counts of the Olympic games, presidential election results, and stock market prices. For stock quote applications, for example, the user can subscribe to an on-line stock quote service, such as one available from the Dow Jones service. The stock information can then be brought into his or her worksheet every 10 seconds. The user further develop formulas to decide how many shares to buy and sell for a particular stock at what price point. This buy and sell decision could then be incorporated into another web page to send to the brokerage house for buy or sale action. All of these can be accomplished by a DOORS according to the present invention without complex programming or HTML script writing.

Combined with multi-user concurrent editing of the same DOORS document, much more complex Internet applications can become possible without programming or HTML script writing. For example, to broadcast professional basketball finals live on Internet, several users may work on the information appearing in a web page at the same time. While someone is working on the statistics, the others can work on action descriptions such as who gets the rebound, who shoots the ball, and who scores, etc. All of these can be done concurrently, and have the web page published automatically and easily without programming and HTML script writing with the present invention.

As illustrated in FIG. 7, the data available on the Internet and the DOORS at any given time can overlap. After the Internet and Office data linkage is established and Office and database data linkage is also established, a DOORS according to the present invention becomes a bridge that connects together Internet data and database data, as illustrated in FIG. 8.

Via a DOORS according to the present invention, Internet data can be easily reflected inside an DOORS Office program and then processed into a database. Any database data can be retrieved from it and become part of a web page by using proper tools known in the art with reference to this disclosure such as a web page editor or a form/report generator. Database data may be brought into the DOORS Office spreadsheet through the query selection before they are used for publishing on the Internet for worldwide users to access.

Additionally, web page containing information entered by e-commerce shoppers may be dissected into cells and then copied or moved to a database record area in a spreadsheet, before it is added or updated into the database table. The creation of Internet commerce applications then becomes easier to accomplish without much coding, if any at all.

A Method to Create Upward Compatible Applications

A computer program often goes through updates to enhance its capabilities. Such enhancements may create data files of different formats. That is, a data file (File X) created by an older version of a computer program (Version A), may conform to a different format from a data file created by a newer version (Version B). The difference could be such that Version B cannot recognize all or part of the contents of File X, making File X less useful if not totally useless to users of Version B. It is common practice to develop Version B so that File X can at least be able to properly read in its entirety, and preferably properly process it also. If so, the computer program (Version B) is said to be "downward compatible".

In prior art, it is thought to be impractical, if not impossible, to create programs that are generically "upward compatible" to data files created by versions of the program newer than itself. That is, following the example above, Version A cannot, in general, read properly a data file created by Version B, let alone process it. One way to achieve this upward compatibility for a data file is to plan precisely the format(s) of data files created by newer versions and to make this format(s) known to the older version. This is generally not practical as this usually puts too much restriction on the development of newer versions.

In the present invention, however, it is possible to achieve upward compatibility in preserving data objects of unknown data object types and limited upward compatibility in processing such data objects.

In a system where the size of the data objects can be determined regardless of the data object type and the internal data format of such data objects, all data objects of unknown data object types can be preserved in the system. When such data objects are encountered by an application when loading a data file, these data objects can be transferred in whole into memory, moved around in memory if necessary, and later saved back to storage. Thus, upward compatibility can be fully achieved.

If a data object of unknown data object type requires processing, such processing can be carried out if it does not depend on the content of such data objects. In a system where the data object attributes of a data object can also be determined regardless of its data object type, such processing can still take advantage of those data object attributes of known attribute types. For example, when a slide object contains a certain picture object with unknown data object type, and the picture is to be enlarged by a certain factor, even though the appearance of the picture object itself cannot be determined, the overall appearance of the slide can still be determined correctly whether before or after the enlargement, if all necessary data object attributes, such as size, scaling factor, and so on, can be recognized.

Further, in such a system where units of processing can be specified and recorded as macro operations, information about required processing of data objects of unknown data object types can be saved as such macro operations in the data file, to be processed when later the data file is processed by an application that can properly process these data objects according to the recorded macro operations. This is called Delayed Processing. When specification of required processing recorded for Delayed Processing does not depend on the contents of such data objects, a DOORS application can achieve effective upward compatibility for processing also.

Note that a DOORS system can be such a system. In addition to the above degree of upward compatibility in data preserving and processing, in a DOORS system, all links to data objects of unknown data object types can also be correctly maintained, as they do not depend on the data object type nor the contents of these data objects.

In a DOORS system, also, when a data object of unknown data object type contains links to other data objects in the system, and changes in the linked data objects occur and require corresponding changes in the former data objects, such processing can be correctly processed if the required processing does not depend on the contents of the former data objects.

For data object attributes of unknown attribute type, under similar conditions, all data object attributes can be preserved at all times, and can be processed correctly provided any processing dependent on the unknown attribute can be specified and is recorded as macro operations to be processed at a later time by applications that are capable of performing such processing.

To summarize, in a system where data objects and their processing fulfill the above conditions, an application can be upward compatible to data files created by versions newer than it. In fact, any application can be compatible to data files created by any other application, within restrictions as described above. The following table 15 presents this summary.

TABLE 15

Summary of Capabilities of Upward Compatible Applications

| Capability | Support | Comments |
| --- | --- | --- |
| Preserving data objects of unknown Object Types | Yes | All data objects can be copied, moved, and stored as whole units. |
| Processing data objects of unknown Object Types | Limited | Processing of data objects of unknown Object Types are restricted to those that are either not dependent on the contents of such data objects or can be achieved through Delayed Processing. |
| Preserving Object Attributes of unknown Attribute Types in data objects | Yes | All such attributes can be copied, moved, and stored as whole units. |
| Processing Object Attributes of unknown Attribute Types in data objects | Limited | Processing of Object Attributes of unknown Attribute Types are restricted to those that are either not dependent on the contents of such attributes can be achieved through Delayed Processing. |

TABLE 15-continued

Summary of Capabilities of Upward Compatible Applications

| Capability | Support | Comments |
| --- | --- | --- |
| Preserving integrity of links to data objects of unknown Object Types | Yes | All links to data objects of unknown Object Types can be maintained properly, as the links reference data objects as whole units. |
| Preserving integrity of links within data objects of unknown Object Types | Limited | Through a Link Table in the data file containing such data objects all such links can be identified, and any required processing within such data objects are restricted to those that can be achieved through Delayed Processing. |

Described below is an embodiment of the present invention that is not in full accordance with the above-described DOORS 10. The data files in this embodiment conform to a Downward Compatible File Format (DCFF) as described below. In this embodiment, regardless of application, all data objects conform to either the Short Format shown in Table 16, or the Long Format shown in Table 17. In the Short Format, the Object Type Code is between 00 h and 0 Fh, and each data object contains a one-byte Object Type Code, and zero or more bytes of Object Content whose exact size and format is pre-determined according to the value of Object Type Code. In the Long Format, the Object Type Code is between 10 h and FFh, and each data object contains a one-byte Object Type Code, a two-byte Object Size designating the total data object size in bytes, one or more DCFF Attributes of which the last being of type "Null Attribute", and zero or more bytes of Object Content whose format is interpreted according to the value of Object Type Code.

The Attributes describe the properties of the data object. For example, for a data object representing a piece of text, the Attributes may designate the font, character size, character color, background color, and so on.

TABLE 16

DCFF Data Object Short Format

| Data Item | Size | Comments |
| --- | --- | --- |
| Object Type Code | 1 byte | Value between 00h and 0Fh |
| Object Content | Variable | Size and internal format dependent on value of Object Type Code |

TABLE 17

DCFF Data Object Long Format

| Data Item | Size | Comments |
| --- | --- | --- |
| Object Type Code | 1 byte | Value between 10h and FFh |
| Object Size | 2 bytes | In bytes, allowing up to 65536 bytes for each data object |
| Attributes | Variable | One or more of Attributes, the last one being of Attribute Type "Null Attribute" |
| Object Content | Variable | Size and internal format dependent on value of Object Type |

A sample of Object Type Codes is shown below in table 18.

TABLE 18

Sample DCFF Data Object Type Codes

| Hexadecimal Value | Data Object Type | Abbreviation |
|---|---|---|
| 00h | Null Object | NO |
| 01h | Single Byte Object | SBO |
| 02h | Integer Object | IO |
| 03h | Long Integer Object | LIO |
| 04h | Floating Number Object | FNO |
| 10h | Byte Array Object | BAO |
| 11h | Sound Data Object | SDO |
| 12h | Animation Clip Object | ACO |
| 13h | Compressed Audio-Video Object | CAVO |
| F1h | Macro Operation Object | MOO |

A DCFF Attribute conforms to either the Short Format shown in Table 19, or the Long Format shown in Table 20 below. As shown, in the Short Format there is but one byte of value 00 h, designating Null Attributes, and in the Long Format there is a one-byte Attribute Code designating the type of Attribute, plus a two-byte Attribute Value designating, e.g., the character size in points, or scaling factor of a picture, or some other property of the associated data object.

TABLE 19

DCFF Attribute Short Format

| Data Item | Size | Comments |
|---|---|---|
| Attribute Type Code | 1 byte | Value is 00h |

TABLE 20

DCFF Attribute Long Format

| Data Item | Size | Comments |
|---|---|---|
| Attribute Type Code | 1 byte | Allowing up to 256 types of Attributes |
| Attribute Value | 2 byte | Value of the Attribute |

A sample of the Attribute Type Codes in DCFF is shown in table 21 below.

TABLE 21

Sample DCFF Attribute Type Codes

| Hexadecimal Value | Attribute Type |
|---|---|
| A0h | Font Name |
| A1h | Font Size |
| A2h | Font Bold |
| A3h | Font Italic |
| A4h | Foreground Color |
| A5h | Background Color |
| A6h | Line Spacing |
| A7h | Horizontal Alignment |
| A8h | Vertical Alignment |
| A9h | Image Resolution |
| AAh | Recording Method |
| B0h | Horizontal Middle Border |
| B1h | Vertical Middle Border |
| B2h | Top Border |
| B3h | Bottom Border |
| B4h | Left Border |
| B5h | Right Border |

TABLE 21-continued

Sample DCFF Attribute Type Codes

| Hexadecimal Value | Attribute Type |
|---|---|
| C0h | Hor-Mid Border Width |
| C1h | Ver-Mid Border Width |
| C2h | Top Border Width |
| C3h | Bottom Border Width |
| C4h | Left Border Width |
| C5h | Right Border Width |
| . . . | |

A file in DCFF has three sections, namely, Control Section, Data Object Section, and Delayed Processing Section, as shown in Table 22 below.

TABLE 22

An Example of a Downward Compatible File Format (DCFF)

| Control Section | Data Object Section | Delayed Processing Section |
|---|---|---|

A DCFF Control Section contains fixed information pertaining to the data file, including data items such as file size, the identifier of the application program that generated this file, the identifier of the application program that last modified this file, file version number, and so on. Data Object Section contains the data objects of direct interest to the application, preceded by the size of the Data Object Section. Delayed Processing Section contains a series of Macro Operation Objects (MOO, type F1h) that specify processing to be performed.

The format of the Control Section can be as shown below in Table 23.

TABLE 23

A Sample Control Section Format

| Data Item | Size | Comments |
|---|---|---|
| File size | 4 bytes | Size of the entire file in bytes |
| Control Information | Variable | Not specified in detail here |

The content of the Control Information for each control code may be as shown in Table 24, with delayed processing as shown in Table 25.

TABLE 24

A Sample Data Object Section Format

| Data Item | Size | Comments |
|---|---|---|
| Data Object 1 | Variable | |
| Data Object 2 | Variable | |
| . . . | | |
| Last Data Object | 1 byte | Type is Null Object. |

TABLE 25

A Sample Delayed Processing Section Format

| Data Item | Size | Comments |
|---|---|---|
| Macro Operation Object 1 | Variable | Value of Object Type is F1h. |
| Macro Operation Object 1 | Variable | Value of Object Type is F1h. |

TABLE 25-continued

A Sample Delayed Processing Section Format

| Data Item | Size | Comments |
|---|---|---|
| Macro Operation Object 1 | Variable | Value of Object Type is F1h. |
| ... | | |
| Last Macro Operation Object | 1 byte | Type is Null Object |

Paste with Link Icon

In the prior art, there are two frequently used icons in a window- and pointing-device-based computer systems, namely Copy and Paste. When a user of such system wishes to make a duplicate of a data object in the system, the user first marks the data object to be copied (the "source data object") with a pointing device, click the Copy Icon, move the Cursor to the desired target position, and then click the Paste Icon to request the system to insert a duplicate of the source data object there.

In a system where there are various data objects in the system shared by a great many applications, links to existing data objects are commonplace. To share a data object already existent in the system, a user would create a link to it at the place where it is needed. In this way, if the source data object ever changes in the future, the system will assure that all links to it are updated automatically, and the user application will be able to process the data object it uses properly.

Thus, to a user of such a system, a frequent operation will be to mark an object (the source object), move to a target position, and insert a link to the source object there, instead of making a duplicate. To facilitate such an operation, a Paste with Link Icon is invented. Clicking on the Paste with Link Icon signals to the system to insert a link to the last marked data object at the current position. Other means is possible to achieve the same purpose in the present invention.

Without the Paste with Link Icon, the user must go through several steps to achieve the same result. For example, the user may have to select the Paste with Link command somewhere in the menu system.

The advantages of Paste with Link Icon are: (1) effectively a duplicate of a certain source data object is created, but this duplicate is always kept up to date with any changes in the source data object, (2) the operation is extremely similar to the prior art Mark-Copy-Paste operation, and a user can adapt to the new Mark-Copy-Paste-with-Link operation with ease, and (3) it takes only one click to complete the linking operation.

Although the present invention has been described in considerable detail with reference to certain preferred versions thereof, other versions are possible. Therefore, the scope of the appended claims should not be limited to the description of the preferred versions contained herein. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A version-compatible data processing system comprising an application program for user interaction with stored data, comprising:
    (a) means for generating, storing, and retrieving data files, each data file comprising a multi-dimensional array of data objects, wherein each data object includes an object type code and object content, the data files having standard identifications of object types and beginning and end extremities of the object data;
    (b) the means for retrieving comprising:
        (i) means for determining recognition of the object type of each object; and
        (ii) means for retrieving each unrecognized object without processing;
    (c) means for processing each recognized object;
    (d) means for indicating unrecognized objects; and
    (e) the means for storing comprising means for storing unrecognized objects without modification,
whereby data files generated and stored by a later version of the application program are processable and restorable as partially processed files by an earlier version of the application program in which not all object types generated by the later version of the program are recognized, the unrecognized objects being subsequently processable upon retrieval of the partially processed files by the later version of the application program.

2. The system of claim 1, wherein:
    (a) each object of the data files further comprises an attribute code according to standard identifications being further of attributes; and
    (b) the means for retrieving further comprises means for determining recognition of attributes of each object, and means for retrieving each unrecognized attribute without processing,
whereby data files generated and stored by a later version of the application program are processable and restorable as partially processed files by an earlier version of the application program in which not all object attributes generated by the later version of the program are recognized, the unrecognized attributes being subsequently processable upon retrieval of the partially processed files by the later version of the application program.

3. The system of claim 1, wherein each data file comprises a control section containing an indication of a length of the file, and the means for retrieving further comprises means for accumulating a length of data elements read in, reading being terminated when the length of data elements read in is equal to the indicated length of the file.

4. The system of claim 1, wherein the application program further comprises:
    (a) means for maintaining a modification trail of each data file, comprising means for recording the unrecognized objects and pending processing thereof;
    (b) means for storing the modification trail in association with the corresponding data file; and
    (c) the means for processing further comprising means for determining from the modification trail, and performing, previously recorded pending processing of data objects.

5. The system of claim 1, wherein each data object has a multi-dimensional object address associated therewith.

6. A version-compatible data processing system comprising first and second versions of an application program for user interaction with stored data, the application program comprising:

(a) means for generating, storing, and retrieving data files, each data file comprising an array of data objects, wherein each data object includes an object type code, and object content, the data files having standard identifications of object types, and beginning and end extremities of the object data, wherein the standard identifications in the second version of the application program is a subset of the standard identifications in the first version of the application program;

(b) the means for retrieving comprising:
  (i) means for determining recognition of the object type of each data object; and
  (ii) retrieving each unrecognized data object without processing;

(c) means for processing each recognized data object;
(d) means for indicating unrecognized data objects; and
(e) the means for storing comprising means for storing unrecognized data objects without modification, whereby data files generated and stored by the first version of the application program are processable and restorable as partially processed files by the second version of the application program in which not all data object types generated by the first version of the program are recognized, the unrecognized data objects being subsequently processable upon retrieval of the partially processed files by the first version of the application program.

7. The system of claim 6, wherein:
(a) each data object of the data files further comprises an attribute code according to the standard identifications being further of attributes; and
(b) the means for retrieving further comprises means for determining recognition of attributes of each data object, and means for retrieving each unrecognized attribute without processing, whereby data files generated and stored by a first version of the application program are processable and restorable as partially processed files by the second version of the application program in which not all data object attributes generated by the first version of the program are recognized, the unrecognized attributes being subsequently processable upon retrieval of the partially processed files by the first version of the application program.

8. The system of claim 6, wherein the application program further comprises:
(a) means for maintaining a modification trail of each data file, comprising means for recording the unrecognized data objects and pending processing thereof;
(b) means for storing the modification trail in association with the corresponding data file; and
(c) the means for processing further comprising means for determining from the modification trail, and performing, previously recorded pending processing of data objects.

9. The system of claim 6, Wherein each data object includes a multi-dimensional object address.

10. A method for data processing using versions of an application program whereby data files generated and stored by a later version of the application are processable and restorable as partially processed files by an earlier version of the application program, comprising:
(a) in a first version of the application program, generating a data file comprising an array of data objects, wherein each object includes an object type code and object content, using standard identifications of object types and beginning and end extremities of the object data;
(b) in the first version of the application program, storing the data file;
(c) in a second, earlier version of the application program having associated therewith a subset of the standard identifications, retrieving and processing the data file, comprising:
  (i) determining recognition of the object type of each object;
  (ii) processing each recognized object; and
  (iii) retrieving each unrecognized object without processing;
(d) in the second version of the application program, indicating unrecognized objects; and
(e) in the second version of the application program, storing the data file as a partially processed data file, comprising storing the unrecognized objects without modification, thereby permitting the unrecognized objects to be subsequently retrieved and processed upon retrieval of the partially processed file by the first version of the application program.

11. The method of claim 10, further comprising, in the first version of the application program, retrieving and further processing the partially processed data file.

12. The method of claim 11, further comprising:
(a) in the second version of the application program, maintaining a modification trail of each data file, comprising recording the unrecognized objects and pending processing thereof;
(b) in the second version of the application program, storing the modification trail in association with the corresponding data file; and
(c) in the first version of the application program, the further processing comprising determining from the modification trail, and performing, previously recorded pending processing of data objects.

13. The method of claim 10, further comprising:
(a) in the generating, including an attribute code in each data object using the standard identifications being further of attributes;
(b) in the retrieving:
  (i) determining recognition of attributes of each object; and
  (ii) processing each recognized attribute; and
  (iii) retrieving each unrecognized attribute without processing.

14. A version-compatible data processing system comprising first and second versions of an application program for user interaction with stored data, the application program comprising:
(a) means for generating, storing, and retrieving data files, each data file comprising an array of data objects, wherein each object includes an object type code, object data, and an attribute code, the data files having standard identifications of object types, beginning and end extremities of the object data, and attributes, wherein the standard identifications in the second version of the application program is a subset of the standard identifications in the first version of the application program;
(b) the means for retrieving comprising:
  (i) means for determining recognition of the object type of each object, and retrieving each unrecognized object without processing; and
  (ii) means for determining recognition of attributes of each object, and means for retrieving each unrecognized attribute without processing;

(c) means for processing each recognized object;
(d) means for indicating unrecognized objects;
(e) the means for storing comprising means for storing unrecognized objects and attributes without modification;
(f) means for maintaining a modification trail of each data file, comprising means for recording the unrecognized objects and pending processing thereof;
(g) means for storing the modification trail in association with the corresponding data file; and
(h) the means for processing further comprising means for determining from the modification trail, and performing, previously recorded pending processing of data objects, whereby data files generated and stored by the first version of the application program are processable and restorable as partially processed files by the second version of the application program in which not all object types generated by the first version of the program are recognized, the unrecognized objects being subsequently processed and the unrecognized attributes being recognized upon retrieval of the partially processed files by the first version of the application program.

15. The system of claim 14, wherein each data object has a multi-dimensional object address associated therewith.

* * * * *